(12) United States Patent
Smith et al.

(10) Patent No.: US 12,311,550 B2
(45) Date of Patent: *May 27, 2025

(54) SMART CONTROL SYSTEM FOR A ROBOTIC DEVICE

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 444 days.

This patent is subject to a terminal disclaimer.

(21) Appl. No.: 17/139,854

(22) Filed: Dec. 31, 2020

(65) Prior Publication Data
US 2022/0203545 A1    Jun. 30, 2022

(51) Int. Cl.
*B25J 9/16*     (2006.01)
*B25J 13/00*    (2006.01)
*B25J 13/08*    (2006.01)
*B25J 19/02*    (2006.01)
*G05D 1/00*     (2024.01)

(52) U.S. Cl.
CPC .......... *B25J 9/1664* (2013.01); *B25J 13/006* (2013.01); *B25J 13/08* (2013.01); *B25J 19/02* (2013.01); *G05B 2219/40174* (2013.01); *G05B 2219/50391* (2013.01)

(58) Field of Classification Search
CPC ...... B25J 9/1664; B25J 9/1602; B25J 13/006; B25J 13/08; B25J 19/02; B25J 9/1689; B25J 9/1697; G05B 2219/50391; G05B 2219/40174; G05D 1/0016
See application file for complete search history.

(56) References Cited

U.S. PATENT DOCUMENTS

| | | | |
|---|---|---|---|
| 1,107,874 | A | 8/1914 | Appleby |
| 1,112,460 | A | 10/1914 | Leavitt |
| 1,515,756 | A | 11/1924 | Roy |

(Continued)

FOREIGN PATENT DOCUMENTS

| | | |
|---|---|---|
| CA | 2512299 A1 | 9/2004 |
| CN | 1603068 A | 4/2005 |

(Continued)

OTHER PUBLICATIONS

Liquidhandwash. (Aug. 26, 2017). Mobile Phone Controlled Robot. Instructables. Retrieved Jan. 19, 2023, from https://www.instructables.com/Mobile-Phone-Controlled-Robot-1/ (Year: 2017).*

(Continued)

*Primary Examiner* — Sohana Tanju Khayer
(74) *Attorney, Agent, or Firm* — Christopher L. Johnson (57) ABSTRACT

A robotic device is disclosed that can have a plurality of non-dedicated, smart control devices. Each smart control device can provide smart functionality to control an operational function of the robotic device. In addition, a robotic system is disclosed that can include a robotic device having a local non-dedicated, smart control device providing smart functionality to control an operational function of the robotic device. The robotic device can also include a remote control device to communicate operational information with the local smart control device to facilitate user control of the robotic device.

54 Claims, 3 Drawing Sheets

(56) References Cited

U.S. PATENT DOCUMENTS

| | | |
|---|---|---|
| 1,975,726 A | 10/1934 | Martinage |
| 2,082,920 A | 6/1937 | Tye |
| 2,311,475 A | 2/1943 | Schmeiser |
| 2,312,072 A | 2/1943 | Broadwater |
| 2,329,582 A | 9/1943 | Bishop |
| 2,345,763 A | 4/1944 | Mayne |
| 2,701,169 A | 2/1955 | Cannon |
| 2,850,147 A | 9/1958 | Hill |
| 2,933,143 A | 4/1960 | Robinson et al. |
| 2,967,737 A | 1/1961 | Moore |
| 3,037,571 A | 6/1962 | Zelle |
| 3,060,972 A | 10/1962 | Sheldon |
| 3,107,643 A | 10/1963 | Edwards |
| 3,166,138 A | 1/1965 | Dunn, Jr. |
| 3,190,286 A | 6/1965 | Stokes |
| 3,215,219 A | 11/1965 | Forsyth et al. |
| 3,223,462 A | 12/1965 | Dalrymple |
| 3,266,059 A | 8/1966 | Stelle |
| 3,284,964 A | 11/1966 | Saito |
| 3,311,424 A | 3/1967 | Taylor |
| 3,362,492 A | 1/1968 | Hansen |
| 3,387,896 A | 6/1968 | Sobota |
| 3,489,236 A | 1/1970 | Goodwin |
| 3,497,083 A | 2/1970 | Anderson et al. |
| 3,565,198 A | 2/1971 | Ames |
| 3,572,325 A | 3/1971 | Bazell et al. |
| 3,609,804 A | 10/1971 | Morrison |
| 3,650,343 A | 3/1972 | Helsell |
| 3,700,115 A | 10/1972 | Johnson et al. |
| 3,707,218 A | 12/1972 | Payne et al. |
| 3,712,481 A | 1/1973 | Harwood |
| 3,715,146 A | 2/1973 | Robertson |
| 3,757,635 A | 9/1973 | Hickerson et al. |
| 3,808,078 A | 4/1974 | Snellman et al. |
| 3,820,616 A | 6/1974 | Juergens |
| 3,841,424 A | 10/1974 | Purcell et al. |
| 3,864,983 A | 2/1975 | Jacobsen |
| 3,933,214 A | 1/1976 | Guibord et al. |
| 3,934,664 A | 1/1976 | Pohjola |
| 3,974,907 A | 8/1976 | Shaw et al. |
| 4,015,553 A | 4/1977 | Middleton |
| 4,051,914 A | 10/1977 | Pohjola |
| 4,059,315 A | 11/1977 | Jolliffe et al. |
| 4,068,905 A | 1/1978 | Black et al. |
| 4,107,948 A | 8/1978 | Molaug |
| 4,109,971 A | 8/1978 | Black et al. |
| 4,132,279 A | 1/1979 | van der Lende et al. |
| 4,218,101 A | 8/1980 | Thompson |
| 4,260,053 A | 4/1981 | Onodera |
| 4,332,317 A | 6/1982 | Bahre et al. |
| 4,332,424 A | 6/1982 | Thompson |
| 4,339,031 A | 7/1982 | Densmore |
| 4,393,728 A | 7/1983 | Larson et al. |
| 4,396,233 A | 8/1983 | Slaght |
| 4,453,611 A | 6/1984 | Stacy, Jr. |
| 4,483,407 A | 11/1984 | Iwamoto et al. |
| 4,489,826 A | 12/1984 | Dubson |
| 4,494,417 A | 1/1985 | Larson et al. |
| 4,551,061 A | 11/1985 | Olenick |
| 4,589,460 A | 5/1986 | Albee |
| 4,621,965 A | 11/1986 | Wilcock |
| 4,636,137 A | 1/1987 | Lemelson |
| 4,646,906 A | 3/1987 | Wilcox, Jr. et al. |
| 4,661,039 A | 4/1987 | Brenholt |
| 4,671,774 A | 6/1987 | Owsen |
| 4,700,693 A | 10/1987 | Lia et al. |
| 4,706,506 A | 11/1987 | Lestelle |
| 4,712,969 A | 12/1987 | Kimura |
| 4,713,896 A | 12/1987 | Jennens |
| 4,714,125 A | 12/1987 | Stacy, Jr. |
| 4,727,949 A | 3/1988 | Rea et al. |
| 4,736,826 A | 4/1988 | White et al. |
| 4,752,105 A | 6/1988 | Barnard |
| 4,756,662 A | 7/1988 | Tanie et al. |
| 4,765,795 A | 8/1988 | Rebman |
| 4,784,042 A | 11/1988 | Paynter |
| 4,796,607 A | 1/1989 | Allred, III et al. |
| 4,806,066 A | 2/1989 | Rhodes et al. |
| 4,815,319 A | 3/1989 | Clement et al. |
| 4,815,911 A | 3/1989 | Bengtsson et al. |
| 4,818,175 A | 4/1989 | Kimura |
| 4,828,339 A | 5/1989 | Thomas et al. |
| 4,828,453 A | 5/1989 | Martin et al. |
| 4,848,179 A | 7/1989 | Ubhayakar |
| 4,862,808 A | 9/1989 | Hedgecoxe et al. |
| 4,878,451 A | 11/1989 | Siren |
| 4,900,218 A | 2/1990 | Sutherland |
| 4,909,341 A | 3/1990 | Rippingale et al. |
| 4,924,153 A | 5/1990 | Toru et al. |
| 4,932,491 A | 6/1990 | Collins, Jr. |
| 4,932,831 A | 6/1990 | White et al. |
| 4,936,639 A | 6/1990 | Pohjola |
| 4,951,758 A | 8/1990 | Sonku et al. |
| 4,997,790 A | 3/1991 | Woo et al. |
| 5,018,591 A | 5/1991 | Price |
| 5,021,798 A | 6/1991 | Ubhayakar |
| 5,022,812 A | 6/1991 | Coughlan et al. |
| 5,046,914 A | 9/1991 | Holland et al. |
| 5,080,000 A | 1/1992 | Bubic |
| 5,130,631 A | 7/1992 | Gordon et al. |
| 5,142,932 A | 9/1992 | Moya et al. |
| 5,172,639 A | 12/1992 | Wiesman et al. |
| 5,174,168 A | 12/1992 | Takagi et al. |
| 5,174,405 A | 12/1992 | Carra et al. |
| 5,186,526 A | 2/1993 | Pennington |
| 5,199,771 A | 4/1993 | James et al. |
| 5,205,612 A | 4/1993 | Sugden et al. |
| 5,214,858 A | 6/1993 | Pepper et al. |
| 5,219,264 A | 6/1993 | McClure et al. |
| 5,252,870 A | 10/1993 | Jacobsen et al. |
| 5,297,443 A | 3/1994 | Wentz |
| 5,317,952 A | 6/1994 | Immega |
| 5,337,732 A | 8/1994 | Grundfest et al. |
| 5,337,846 A | 8/1994 | Ogaki et al. |
| 5,350,033 A | 9/1994 | Kraft |
| 5,354,124 A | 10/1994 | James |
| 5,363,935 A | 11/1994 | Schempf et al. |
| 5,386,741 A | 2/1995 | Rennex |
| 5,413,454 A | 5/1995 | Movsesian |
| 5,426,336 A | 6/1995 | Jacobsen et al. |
| 5,428,713 A | 6/1995 | Matsumaru |
| 5,435,405 A | 7/1995 | Schempf et al. |
| 5,440,916 A | 8/1995 | Stone et al. |
| 5,443,354 A | 8/1995 | Stone et al. |
| 5,451,135 A | 9/1995 | Schempf et al. |
| 5,465,525 A | 11/1995 | Mifune et al. |
| 5,466,056 A | 11/1995 | James et al. |
| 5,469,756 A | 11/1995 | Feiten |
| 5,516,249 A | 5/1996 | Brimhall |
| 5,519,814 A | 5/1996 | Rodriguez et al. |
| 5,551,545 A | 9/1996 | Gelfman |
| 5,556,370 A | 9/1996 | Maynard |
| 5,562,843 A | 10/1996 | Yasumoto |
| 5,567,110 A | 10/1996 | Sutherland |
| 5,570,992 A | 11/1996 | Lemelson |
| 5,573,316 A | 11/1996 | Wankowski |
| 5,588,688 A | 12/1996 | Jacobsen et al. |
| 5,672,044 A | 9/1997 | Lemelson |
| 5,697,285 A | 12/1997 | Nappi et al. |
| 5,712,961 A | 1/1998 | Matsuo |
| 5,749,828 A | 5/1998 | Solomon et al. |
| 5,770,913 A | 6/1998 | Mizzi |
| 5,816,769 A | 10/1998 | Bauer et al. |
| 5,821,666 A | 10/1998 | Matsumoto et al. |
| 5,842,381 A | 12/1998 | Feiten |
| RE36,025 E | 1/1999 | Suzuki |
| 5,878,783 A | 3/1999 | Smart |
| 5,888,235 A | 3/1999 | Jacobsen et al. |
| 5,902,254 A | 5/1999 | Magram |
| 5,906,591 A | 5/1999 | Dario et al. |
| 5,984,032 A | 11/1999 | Gremillion et al. |
| 5,996,346 A | 12/1999 | Maynard |
| 6,016,385 A | 1/2000 | Yee et al. |
| 6,030,057 A | 2/2000 | Fikse |

(56) References Cited

U.S. PATENT DOCUMENTS

| | | |
|---|---|---|
| 6,056,237 A | 5/2000 | Woodland |
| 6,107,795 A | 8/2000 | Smart |
| 6,109,705 A | 8/2000 | Courtemanche |
| 6,113,343 A | 9/2000 | Goldenberg et al. |
| 6,132,133 A | 10/2000 | Muro et al. |
| 6,138,604 A | 10/2000 | Anderson et al. |
| 6,162,171 A | 12/2000 | Ng et al. |
| 6,186,604 B1 | 2/2001 | Fikse |
| 6,203,126 B1 | 3/2001 | Harguth |
| 6,260,501 B1 | 7/2001 | Agnew |
| 6,263,989 B1 | 7/2001 | Won |
| 6,264,293 B1 | 7/2001 | Musselman et al. |
| 6,264,294 B1 | 7/2001 | Musselman et al. |
| 6,281,489 B1 | 8/2001 | Tubel et al. |
| 6,323,615 B1 | 11/2001 | Khairallah |
| 6,325,749 B1 | 12/2001 | Inokuchi et al. |
| 6,333,631 B1 | 12/2001 | Das et al. |
| 6,339,993 B1 | 1/2002 | Comello et al. |
| 6,380,889 B1 | 4/2002 | Herrmann et al. |
| 6,394,204 B1 | 5/2002 | Haringer |
| 6,405,798 B1 | 6/2002 | Barrett et al. |
| 6,408,224 B1 | 6/2002 | Okamoto et al. |
| 6,411,055 B1 | 6/2002 | Fujita et al. |
| 6,422,509 B1 | 7/2002 | Yim |
| 6,430,475 B2 | 8/2002 | Okamoto et al. |
| 6,431,296 B1 | 8/2002 | Won |
| 6,446,718 B1 | 9/2002 | Barrett et al. |
| 6,450,104 B1 | 9/2002 | Grant et al. |
| 6,477,444 B1 | 11/2002 | Bennett, III et al. |
| 6,484,083 B1 | 11/2002 | Hayward et al. |
| 6,488,306 B1 | 12/2002 | Shirey et al. |
| 6,505,896 B1 | 1/2003 | Boivin et al. |
| 6,512,345 B2 | 1/2003 | Borenstein et al. |
| 6,522,950 B1 | 2/2003 | Conca et al. |
| 6,523,629 B1 | 2/2003 | Buttz et al. |
| 6,529,806 B1 | 3/2003 | Licht |
| 6,535,793 B2 | 3/2003 | Allard |
| 6,540,310 B1 | 4/2003 | Cartwright |
| 6,557,954 B1 | 5/2003 | Hattori |
| 6,563,084 B1 | 5/2003 | Bandy et al. |
| 6,574,958 B1 | 6/2003 | MacGregor |
| 6,576,406 B1 | 6/2003 | Jacobsen et al. |
| 6,595,812 B1 | 7/2003 | Haney |
| 6,610,007 B2 | 8/2003 | Belson et al. |
| 6,619,146 B2 | 9/2003 | Kerrebrock |
| 6,636,781 B1 | 10/2003 | Shen et al. |
| 6,651,804 B2 | 11/2003 | Thomas et al. |
| 6,652,164 B2 | 11/2003 | Stiepel et al. |
| 6,668,951 B2 | 12/2003 | Won |
| 6,708,068 B1 | 3/2004 | Sakaue |
| 6,715,575 B2 | 4/2004 | Karpik |
| 6,725,128 B2 | 4/2004 | Hogg et al. |
| 6,772,673 B2 | 8/2004 | Seto et al. |
| 6,773,327 B1 | 8/2004 | Felice et al. |
| 6,774,597 B1 | 8/2004 | Borenstein |
| 6,799,815 B2 | 10/2004 | Krishnan et al. |
| 6,802,236 B1 | 10/2004 | Richardson |
| 6,820,653 B1 | 11/2004 | Schempf et al. |
| 6,831,436 B2 | 12/2004 | Gonzalez |
| 6,835,173 B2 | 12/2004 | Couvillon, Jr. |
| 6,837,318 B1 | 1/2005 | Craig et al. |
| 6,840,588 B2 | 1/2005 | Deland et al. |
| 6,866,671 B2 | 3/2005 | Tierney et al. |
| 6,870,343 B2 | 3/2005 | Borenstein et al. |
| 6,889,118 B2 | 5/2005 | Murray, IV et al. |
| 6,917,176 B2 | 7/2005 | Schempf et al. |
| 6,923,693 B2 | 8/2005 | Borgen et al. |
| 6,936,003 B2 | 8/2005 | Iddan |
| 6,959,231 B2 | 10/2005 | Maeda |
| 6,971,141 B1 | 12/2005 | Tak |
| 7,017,687 B1 | 3/2006 | Jacobsen et al. |
| 7,020,701 B1 | 3/2006 | Gelvin et al. |
| 7,040,426 B1 | 5/2006 | Berg |
| 7,044,245 B2 | 5/2006 | Anhalt et al. |
| 7,069,124 B1 | 6/2006 | Whittaker et al. |
| 7,090,637 B2 | 8/2006 | Danitz et al. |
| 7,137,465 B1 | 11/2006 | Kerrebrock et al. |
| 7,144,057 B1 | 12/2006 | Young et al. |
| 7,171,279 B2 | 1/2007 | Buckingham et al. |
| 7,188,473 B1 | 3/2007 | Asada et al. |
| 7,188,568 B2 | 3/2007 | Stout |
| 7,228,203 B2 | 6/2007 | Koselka et al. |
| 7,235,046 B2 | 6/2007 | Anhalt et al. |
| 7,331,436 B1 | 2/2008 | Pack et al. |
| 7,387,179 B2 | 6/2008 | Anhalt et al. |
| 7,415,321 B2 | 8/2008 | Okazaki et al. |
| 7,475,745 B1 | 1/2009 | DeRoos |
| 7,539,557 B2 | 5/2009 | Yamauchi |
| 7,546,912 B1 | 6/2009 | Pack et al. |
| 7,597,162 B2 | 10/2009 | Won |
| 7,600,592 B2 | 10/2009 | Goldenberg et al. |
| 7,645,110 B2 | 1/2010 | Ogawa et al. |
| 7,654,348 B2 | 2/2010 | Ohm et al. |
| 7,762,362 B2 | 7/2010 | Cutkosky et al. |
| 7,775,312 B2 | 8/2010 | Maggio |
| 7,798,264 B2 | 9/2010 | Hutcheson et al. |
| 7,843,431 B2 | 11/2010 | Robbins et al. |
| 7,845,440 B2 | 12/2010 | Jacobsen |
| 7,860,614 B1 | 12/2010 | Reger |
| 7,874,386 B2 | 1/2011 | Ben-Tzvi et al. |
| 7,974,736 B2 | 7/2011 | Morin et al. |
| 8,002,365 B2 | 8/2011 | Jacobsen et al. |
| 8,002,716 B2 | 8/2011 | Jacobsen et al. |
| 8,042,630 B2 | 10/2011 | Jacobsen |
| 8,162,410 B2 | 4/2012 | Hirose et al. |
| 8,185,241 B2 | 5/2012 | Jacobsen |
| 8,205,695 B2 | 6/2012 | Jacobsen et al. |
| 8,225,892 B2 | 7/2012 | Ben-Tzvi |
| 8,317,555 B2 | 11/2012 | Jacobsen et al. |
| 8,392,036 B2 | 3/2013 | Jacobsen et al. |
| 8,393,422 B1 | 3/2013 | Pensel |
| 8,434,576 B1 | 5/2013 | Ferguson |
| 8,571,711 B2 | 10/2013 | Jacobsen et al. |
| 8,935,014 B2 | 1/2015 | Jacobsen et al. |
| 9,031,698 B2 | 5/2015 | Smith |
| 9,409,292 B2 | 8/2016 | Smith et al. |
| 10,646,993 B1 | 5/2020 | Wiley |
| 11,209,887 B1 * | 12/2021 | Jung .................. G05D 1/0005 |
| 2001/0037163 A1 | 11/2001 | Allard |
| 2002/0038168 A1 | 3/2002 | Kasuga et al. |
| 2002/0128714 A1 | 9/2002 | Manasas et al. |
| 2002/0140392 A1 | 10/2002 | Borenstein et al. |
| 2002/0189871 A1 | 12/2002 | Won |
| 2003/0000747 A1 | 1/2003 | Sugiyama et al. |
| 2003/0069474 A1 | 4/2003 | Couvillon, Jr. |
| 2003/0097080 A1 | 5/2003 | Esashi et al. |
| 2003/0110938 A1 | 6/2003 | Seto et al. |
| 2003/0223844 A1 | 12/2003 | Schiele et al. |
| 2004/0030571 A1 | 2/2004 | Solomon |
| 2004/0099175 A1 | 5/2004 | Perrot et al. |
| 2004/0103740 A1 | 6/2004 | Townsend et al. |
| 2004/0168837 A1 | 9/2004 | Michaud et al. |
| 2004/0216931 A1 | 11/2004 | Won |
| 2004/0216932 A1 | 11/2004 | Giovanetti et al. |
| 2005/0007055 A1 | 1/2005 | Borenstein et al. |
| 2005/0027412 A1 | 2/2005 | Hobson et al. |
| 2005/0085693 A1 | 4/2005 | Belson et al. |
| 2005/0107669 A1 | 5/2005 | Couvillon, Jr. |
| 2005/0115337 A1 | 6/2005 | Tarumi |
| 2005/0166413 A1 | 8/2005 | Crampton |
| 2005/0168068 A1 | 8/2005 | Courtemanche et al. |
| 2005/0168070 A1 | 8/2005 | Dandurand |
| 2005/0225162 A1 | 10/2005 | Gibbins |
| 2005/0235898 A1 | 10/2005 | Hobson et al. |
| 2005/0235899 A1 | 10/2005 | Yamamoto et al. |
| 2005/0288819 A1 | 12/2005 | de Guzman |
| 2006/0000137 A1 | 1/2006 | Valdivia y Alvarado et al. |
| 2006/0005733 A1 | 1/2006 | Rastegar et al. |
| 2006/0010702 A1 | 1/2006 | Roth et al. |
| 2006/0010998 A1 | 1/2006 | Lloyd et al. |
| 2006/0070775 A1 | 4/2006 | Anhalt et al. |
| 2006/0117324 A1 | 6/2006 | Alsafadi et al. |
| 2006/0156851 A1 | 7/2006 | Jacobsen et al. |
| 2006/0225928 A1 | 10/2006 | Nelson |

(56) References Cited

U.S. PATENT DOCUMENTS

| | | |
|---|---|---|
| 2006/0229773 A1 | 10/2006 | Peretz |
| 2006/0290779 A1 | 12/2006 | Reverte et al. |
| 2007/0029117 A1 | 2/2007 | Goldenberg et al. |
| 2007/0156286 A1 | 7/2007 | Yamauchi |
| 2007/0193790 A1 | 8/2007 | Goldenberg et al. |
| 2007/0260378 A1 | 11/2007 | Clodfelter |
| 2007/0289786 A1 | 12/2007 | Cutkosky et al. |
| 2007/0293989 A1 | 12/2007 | Norris |
| 2008/0115687 A1 | 5/2008 | Gal |
| 2008/0136254 A1 | 6/2008 | Jacobsen |
| 2008/0164079 A1 | 7/2008 | Jacobsen |
| 2008/0168070 A1 | 7/2008 | Naphade et al. |
| 2008/0192569 A1 | 8/2008 | Ray et al. |
| 2008/0215185 A1 | 9/2008 | Jacobsen et al. |
| 2008/0272647 A9 | 11/2008 | Hirose et al. |
| 2008/0281468 A1 | 11/2008 | Jacobsen et al. |
| 2008/0284244 A1 | 11/2008 | Hirose et al. |
| 2009/0025988 A1 | 1/2009 | Jacobsen et al. |
| 2009/0035097 A1 | 2/2009 | Loane |
| 2009/0095209 A1 | 4/2009 | Jamieson |
| 2009/0171151 A1 | 7/2009 | Choset et al. |
| 2009/0212157 A1 | 8/2009 | Arlton et al. |
| 2009/0248202 A1 | 10/2009 | Osuka et al. |
| 2010/0012320 A1 | 1/2010 | Vail, III |
| 2010/0030377 A1 | 2/2010 | Unsworth |
| 2010/0036544 A1 | 2/2010 | Mashiach |
| 2010/0258365 A1 | 10/2010 | Jacobsen |
| 2010/0268470 A1 | 10/2010 | Kamal et al. |
| 2010/0318242 A1 | 12/2010 | Jacobsen et al. |
| 2011/0288684 A1* | 11/2011 | Farlow .................. B25J 9/1697 |
| | | 901/1 |
| 2012/0185095 A1 | 7/2012 | Rosenstein et al. |
| 2012/0205168 A1 | 8/2012 | Flynn et al. |
| 2012/0264414 A1 | 10/2012 | Fung |
| 2012/0277914 A1 | 11/2012 | Crow et al. |
| 2012/0292120 A1 | 11/2012 | Ben-Tzvi |
| 2014/0121835 A1* | 5/2014 | Smith ...................... B25J 5/005 |
| | | 700/259 |
| 2014/0246287 A1* | 9/2014 | Zhang .................... G07D 11/22 |
| | | 194/207 |
| 2015/0081092 A1 | 3/2015 | Jacobsen et al. |
| 2015/0142252 A1* | 5/2015 | Hutson ................ G05D 1/0038 |
| | | 701/28 |
| 2017/0355405 A1 | 12/2017 | Podnar |
| 2019/0291277 A1 | 9/2019 | Oleynik |
| 2019/0358822 A1* | 11/2019 | Wojciechowski ..... G06V 40/28 |
| 2022/0019236 A1* | 1/2022 | Ben-David .......... G05D 1/0297 |
| 2023/0371769 A1* | 11/2023 | Kwak ....................... B25J 9/16 |
| 2024/0107281 A1* | 3/2024 | Siswick ................ H04W 4/48 |
| 2024/0149446 A1* | 5/2024 | Tomiie ................... B25J 9/1602 |

FOREIGN PATENT DOCUMENTS

| | | |
|---|---|---|
| CN | 2774717 Y | 4/2006 |
| CN | 1970373 A | 5/2007 |
| DE | 3025840 A1 | 2/1982 |
| DE | 3626238 A1 | 2/1988 |
| DE | 3626328 A1 | 2/1988 |
| DE | 19617852 A1 | 10/1997 |
| DE | 19714464 A1 | 10/1997 |
| DE | 19704080 A1 | 8/1998 |
| DE | 10018075 A1 | 1/2001 |
| DE | 102004010089 A1 | 9/2005 |
| EP | 0105418 A1 | 4/1984 |
| EP | 0584520 A1 | 3/1994 |
| EP | 0818283 A1 | 1/1998 |
| EP | 0924034 A2 | 6/1999 |
| EP | 1510896 A1 | 3/2005 |
| EP | 1444043 B1 | 12/2005 |
| EP | 1832501 A2 | 9/2007 |
| EP | 1832502 A1 | 9/2007 |
| EP | 2659321 B1 | 5/2015 |
| FR | 2638813 A1 | 5/1990 |
| FR | 2660730 A1 | 10/1991 |
| FR | 2850350 A1 | 7/2004 |
| GB | 1199729 | 7/1970 |
| JP | 51-106391 | 8/1976 |
| JP | 52 57625 | 5/1977 |
| JP | 58-89480 A | 5/1977 |
| JP | 52122431 | 9/1977 |
| JP | S58-80387 | 5/1983 |
| JP | 59139494 U | 9/1984 |
| JP | 6015275 A | 1/1985 |
| JP | 6047771 A | 3/1985 |
| JP | 6060516 A | 4/1985 |
| JP | 60139576 A | 7/1985 |
| JP | S60-211315 | 10/1985 |
| JP | 61-1581 | 1/1986 |
| JP | S61-180885 U | 1/1986 |
| JP | S61-20484 U | 2/1986 |
| JP | 61-54378 A | 3/1986 |
| JP | 61-75069 A | 4/1986 |
| JP | 61-89182 A | 5/1986 |
| JP | S62-36885 U | 3/1987 |
| JP | 62-165207 A | 7/1987 |
| JP | 62-162626 U | 10/1987 |
| JP | SHO 63-32084 U | 3/1988 |
| JP | 63306988 A | 12/1988 |
| JP | H02-109691 A | 4/1990 |
| JP | 04092784 A | 3/1992 |
| JP | 4126656 A | 4/1992 |
| JP | 5-3087 U | 1/1993 |
| JP | 5147560 A | 6/1993 |
| JP | 5-270454 A | 10/1993 |
| JP | 5-286460 A | 11/1993 |
| JP | 6-115465 A | 4/1994 |
| JP | 8-133141 A | 11/1994 |
| JP | 7-216936 A | 8/1995 |
| JP | 7-329837 | 12/1995 |
| JP | 7-329841 A | 12/1995 |
| JP | 9-142347 | 6/1997 |
| JP | H11-277466 A | 10/1999 |
| JP | 11-347970 A | 12/1999 |
| JP | 2003-019985 A | 1/2003 |
| JP | 2003-237618 A | 8/2003 |
| JP | 2003-315486 A | 11/2003 |
| JP | 2004-080147 A | 3/2004 |
| JP | 3535508 B1 | 6/2004 |
| JP | 2004-536634 A | 12/2004 |
| JP | 2005-019331 A | 1/2005 |
| JP | 2005-081447 A | 3/2005 |
| JP | 2005-111595 A | 4/2005 |
| JP | 2006-510496 A | 3/2006 |
| JP | 2007-237991 A | 9/2007 |
| JP | 2010-509129 A | 3/2010 |
| JP | 2012-056001 A | 3/2012 |
| KR | 2001-0001624 A | 1/2001 |
| KR | 2006-0131167 A | 12/2006 |
| WO | WO 87/02635 | 5/1987 |
| WO | WO 96/37727 | 11/1996 |
| WO | WO 97/26039 | 7/1997 |
| WO | WO 00/10073 | 2/2000 |
| WO | WO 02/16995 A2 | 2/2002 |
| WO | WO 02/095517 A1 | 11/2002 |
| WO | WO 03/030727 A2 | 4/2003 |
| WO | WO 03/037515 A1 | 5/2003 |
| WO | WO 2004/056537 A2 | 7/2004 |
| WO | WO 2005/018428 A2 | 3/2005 |
| WO | WO 2006/068080 A1 | 6/2006 |
| WO | WO 2008/049050 A2 | 4/2008 |
| WO | WO 2008/076194 A2 | 6/2008 |
| WO | WO 2008/127310 A2 | 10/2008 |
| WO | WO 2008/135978 A2 | 11/2008 |
| WO | WO 2009/009673 A2 | 1/2009 |
| WO | WO 2010/070666 A1 | 6/2010 |
| WO | WO 2012/061932 A1 | 5/2012 |
| WO | WO 2012/125903 A2 | 9/2012 |

OTHER PUBLICATIONS

Samanfern. (Oct. 20, 2018). Bluetooth Controlled Car. Arduino Project Hub. Retrieved Jan. 19, 2023, from https://projecthub.

(56) References Cited

OTHER PUBLICATIONS arduino.cc/samanfern/c71cd04b-79fd-4d0a-8a4b-b1dacc2f7725 (Year: 2018).*
Jithin. (Oct. 1, 2020). How to Make a Smart Phone Controlled Robot? Complete Step by Step Instructions. Rootsaid. Retrieved Jan. 19, 2023, from https://rootsaid.com/smart-phone-controlled-robot/ (Year: 2020).*
Benefits of encryption and How It works | global payments integrated. Global Payments Integrated. (Mar. 10, 2020). https://www.globalpaymentsintegrated.com/en-us/blog/2020/03/10/the-benefits-of-encryption-and-how-it-works (Year: 2020).*
Strickland, J. (Apr. 9, 2008). How shared computing works. HowStuffWorks. https://computer.howstuffworks.com/shared-computing.htm#:~:text=Shared%20computing%20is%20a%20kind,to%20help%20achieve%20a%20goal. (Year: 2008).*
Advertisement, International Defense review, Jane's information group, Nov. 1, 1990, p. 54, vol. 23, No. 11, Great Britain.
Arduino, How to Make a Bluetooth Controlled RC Car at Home—Arduino Project Hub, https://create.arduino.cc/projecthub/shubhamsuresh/how-to-make-a-bluetooth-controlled-rc-car-at-home/521212, Sep. 30, 2019, 28 pages, New York, New York.
Arnold, Henry, "Cricket the robot documentation." online manual available at http://www.parallaxinc.com, 22 pages.
Berlin et al., "MEMS-based control of structural dynamic instability", Journal of Intelligent Material Systems and Structures, Jul. 1998 pp. 574-586, vol. 9.
Blackburn, et al.; Improved mobility in a multi-degree-of-freedom unmanned ground vehicle; *Unmanned Ground Vehicles Technology VI*; Sep. 2, 2004; 124-134; Proceedings of SPIE vol. 5422.
Braure, Jerome, "Participation to the construction of a salamander robot: exploration of the morphological configuration and the locomotion controller", Biologically Inspired Robotics Group, master thesis, Feb. 17, 2004, pp. 1-46.
Burg et al; Anti-Lock Braking and Traction Control Concept for All-Terrain Robotic Vehicles; Proceedings of the 1997 IEE International Conference on Robotics and Automation; Albuquerque, New Mexico; Apr. 1997; 6 pages.
Celaya et al; Control of a Six-Legged Robot Walking on Abrupt Terrain; Proceedings of the 1996 IEE International Conference on Robotics and Automation, Minneapolis, Minnesota; Apr. 1996; 6 pages.
Dowling, "Limbless Locomotion: Learning to crawl with a snake robot," The Robotics Institute at Carnegie Mellon University, Dec. 1997, pp. 1-150.
Goldfarb, "Design and energetic characterization of a liquid-propellant-powered actuator for self-powered robots," IEEE Transactions On Mechatronics, Jun. 2003, vol. 8 No. 2.

Hirose, et al., "Snakes and strings; new robotic components for rescue operations," International Journal of Robotics Research, Apr.-May 2004, pp. 341-349, vol. 23, No. 4-5.
Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.
Jacobsen, et al., Advanced intelligent mechanical sensors (AIMS), Proc. IEEE Trandsucers 1991, Jun. 24-27, abstract only, San Fransico, CA.
Jacobsen, et al., "Research robots for applications in artificial intelligence, teleoperation and entertainment", International Journal of Robotics Research, 2004, pp. 319-330, vol. 23.
Jacobsen, et al., "Multiregime MEMS sensor networks for smart structures," Procs. SPIE 6th Annual Inter. Conf. on Smart Structues and Materials, Mar. 1-5, 1999, pp. 19-32, vol. 3673, Newport Beach CA.
MacLean et al., "A digital MEMS-based strain gage for structural health monitoring," Procs. 1997 MRS Fall Meeting Symposium, Nov. 30-Dec. 4, 1997, pp. 309-320, Boston Massachusetts.
Mahabatra et al; "Design and Implementation of Coordinated Multipurpose Robotic System with RF and Light Communication Channels"; Paper entirely based on study, research and experiments.
Matthew Heverly & Jaret Matthews: "A wheel-on-limb rover for lunar operation" Internet article, Nov. 5, 2008, pp. 1-8, http://robotics.estec.esa.int/i-SAIRAS/isairas2008/Proceedings/SESSION%2026/m116-Heverly.pdf.
Mehling, et al.; "A Minimally Invasive Tendril Robot for In-Space Inspection"; Biomedical Robotics and Biomechatronis, 2006.
NASA: "Nasa's newest concept vehicles take off-roading out of this world" Internet article, Nov. 5, 2008, http://www.nasa.gov/mission_pages/constellation/main/lunar_truck.html.
Nilas Sueset et al., "A PDA-based high-level human-robot interaction" Robotics, Automation and Mechatronics, IEEE Conference Singapore, Dec. 1-3, 2004, vol. 2, pp. 1158-1163.
Paap et al., "A robot snake to inspect broken buildings," IEEE, 2000, pp. 2079-2082, Japan.
Ren Luo "Development of a multibehavior-based mobile robot for remote supervisory control through the internet" IEEE/ ASME Transactions on mechatronics, IEEE Service Center, Piscataway, NY, Dec. 1, 2000, vol. 5, No. 4.
Revue Internationale De defense, "3-D vision and urchin" Oct. 1, 1988, p. 1292, vol. 21, No. 10, Geneve CH.
Schenker, et al.; "Reconfigurable robots for all terrain exploration"; 2000, CIT.
Simmons et al; "Coordinated Deployment of Multiple, Heterogeneous Robots"; School of Computer Science, Carnegie Mellon University, Pittsburgh PA.; Honeywell Technology Center, Minneapolis, MN; Intelligent Robot Systems, 2000; vol. 3 pp. 2254-2260.

* cited by examiner

SMART CONTROL SYSTEM FOR A ROBOTIC DEVICE

BACKGROUND

Robotics is an active area of research, and many different types of robotic vehicles have been developed for various tasks. For example, unmanned aerial vehicles have been quite successful in military aerial reconnaissance. Less success has been achieved with unmanned ground vehicles, however, in part because the ground environment is significantly more difficult to traverse than the airborne environment.

Unmanned ground vehicles face many challenges when attempting mobility. Terrain can vary widely, including for example, loose and shifting materials, obstacles, vegetation, limited width or height openings, steps, and the like. A vehicle optimized for operation in one environment may perform poorly in other environments.

There are also tradeoffs associated with the size of vehicle. Large vehicles can handle some obstacles better, including for example steps, drops, gaps, and the like. On the other hand, large vehicles cannot easily negotiate narrow passages or crawl inside pipes, and are more easily deterred by vegetation. Large vehicles also tend to be more readily spotted, and thus can be less desirable, such as for discrete surveillance applications. In contrast, while small vehicles are more discrete, surmounting obstacles becomes a greater navigational challenge.

A variety of mobility configurations have been adapted to traverse difficult terrain. These options include legs, wheels, and tracks. Legged robots can be agile, but use complex control mechanisms to move and achieve stability. Wheeled vehicles can provide high mobility, but provide limited traction and require width in order to achieve stability.

To operate and control the various functions of these various robotic devices, such as the drive systems, any sensor systems, any processing systems, or any other type of on-board system, the robot platforms they are built upon comprise dedicated systems fully integrated into the design and configuration of the robotic devices. These dedicated systems comprise individual component parts that are specifically configured for use within each robotic device. In other words, these dedicated systems are a part of the very design of the robotic devices. They are integrated, built-in components that are not interchangeable, modular, or intended for operation as a stand-alone electronic devices, nor are they self-contained (comprise their own chassis, framework, etc.) and removable relative to the robotic device.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A variety of robotic devices are known and have traditionally been configured with dedicated onboard control systems for controlling both the robotic device as well as various internal and external sensors. Such dedicated control systems can be complicated, costly, and difficult to reconfigure if modifications to the system are desired. For example, adding an external sensor can necessitate a reconfiguration of the dedicated control system. Robotic devices and robotic systems are disclosed that include non-dedicated smart control devices that can be associated therewith and that allow a high degree of customization. It is noted that the present scope includes any type of robotic system or device.

In one embodiment, for example, a robotic device is disclosed that can have a plurality of non-dedicated, smart control devices. Each smart control device can provide smart functionality to control an operational function of the robotic device.

A robotic system is also disclosed that can include a robotic device having a local non-dedicated, smart control device providing smart functionality to control an operational function of the robotic device. The robotic system can also include a remote control device to communicate operational information with the local smart control device to facilitate user control of the robotic device.

Figure 1:
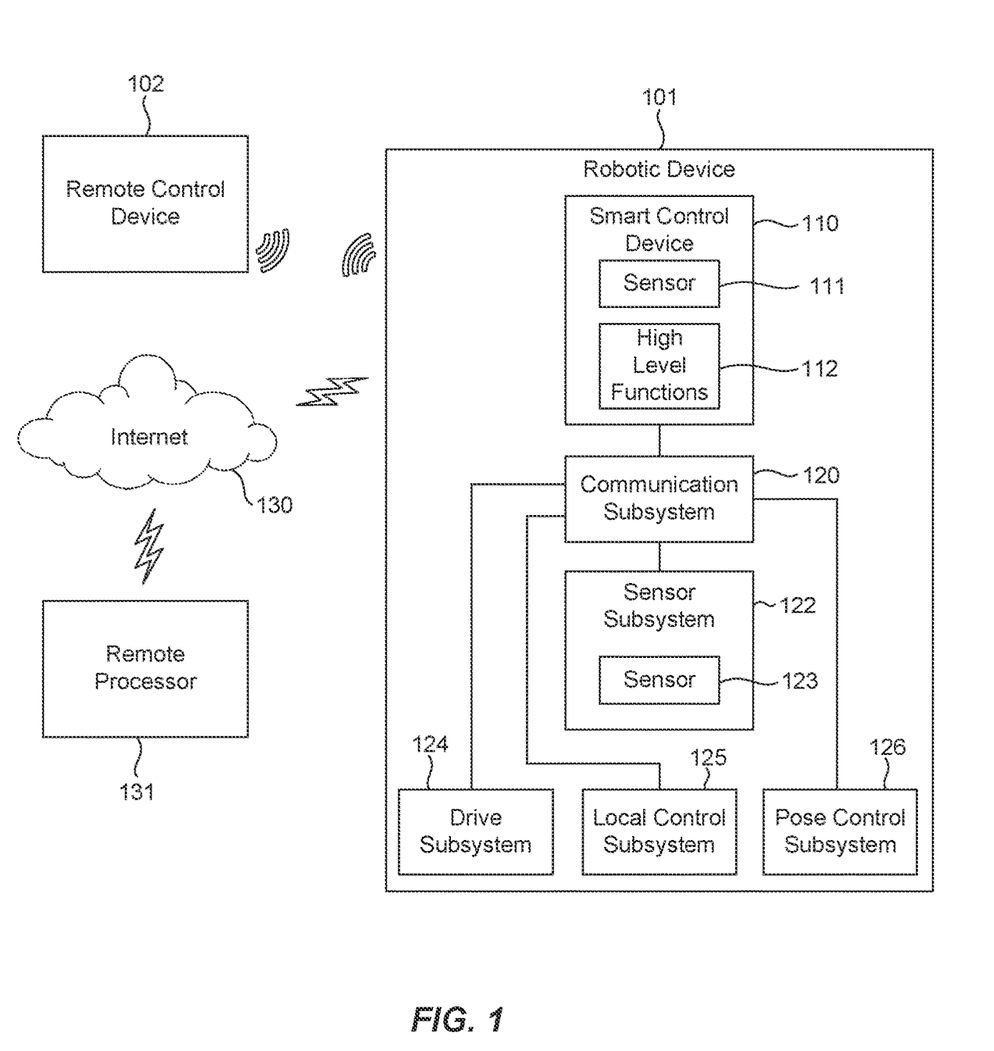
FIG. 1 is a schematic illustration of a robotic system in accordance with an example of the present disclosure.

FIG. 1 illustrates a robotic system 100 in accordance with an example of the present disclosure. The robotic system 100 can include a robotic device 101 and a remote control device 102. The robotic device 101 can have a local non-dedicated, smart control device 110 that can provide smart functionality to control an operational function of the robotic device similar to that disclosed in U.S. Pat. No. 9,031,698, which is incorporated by reference in its entirety herein. The remote control device 102 can communicate operational information with the local smart control device to facilitate user control of the robotic device 101.

The robotic device 101 can include a communication subsystem 120 functionally or operationally coupled to and interfaced with (e.g., electrically coupled or in communication with, mechanically coupled, or both of these) the local smart control device 110 to facilitate control by the local smart control device 110 of one or more operational subsystems of the robotic device, such as a sensor subsystem 122, a motion subsystem (e.g., a drive subsystem 124 or a pose control subsystem 126), a local control subsystem (e.g., a local or degree of freedom (DOF) control subsystem 125), etc. The communication subsystem 120 can comprise any communication medium capable of controlling the robotic device 101. Non-limiting examples of such communication media can include electrical coupling, optical coupling, wireless coupling, Bluetooth coupling, and the like, including combinations thereof. As such, the type of communication medium may dictate the structure of the communication subsystem itself. For example, a communication subsystem utilizing electrical coupling can include wired connections from the various components of the robotic device. A communication subsystem utilizing wireless communication, on the other hand, can include a series of transmitters and receivers coupling the smart control device to the various subsystems.

Although FIG. 1 is a schematic representation, it should be recognized that the non-dedicated, smart control device 110 can be removably supported about a structural component of the robotic device 101. In one aspect, the smart control device 110 can be configured to initiate and control operational functionality within the robotic device 101 upon being physically connected to the robotic device 101. The communication subsystem 120 can facilitate control by the smart control device 110 (once connected) of one or more subsystems of the robotic device 101. It is important to note that the smart control device 110 is not merely a remote control for the robotic device 101, but rather is a computational device operable with and residing on the device 101 capable of carrying out commands, gathering and processing data, performing some level of programmed decision making, and the like as further described below.

For example, the smart control device 110 can control one or more operational functions of the robotic device 101, such as controlling movement or pose of the robotic device 101, or controlling sensors of the robotic device 101. The smart control device 110 can control movement or pose of the robotic device 101 through actuation of the drive subsystem 124 or actuation of the pose control subsystem 126. Information from one or more sensors 123 of the sensor subsystem 122 or information from one or more sensors 111 of the smart control device 110 can be used to determine movement or pose of the robotic device 101. Operation of the sensors 111, 123 can be controlled by the smart control device 110. The smart control device 110 an also include a high-level functions module 112, which can provide functions such as localization and mapping, path retrace, etc., as discussed in more detail below. The communication subsystem 120 can be functionally coupled to the drive subsystem 124, the local control subsystem 125, the pose control subsystem 126, or the sensor subsystem 122. The communication subsystem 120 is also functionally coupled to the smart control device 110. The smart control device 110 can perform sensing, data processing, logic processing, command execution, and other functions germane to the robot to control movement or pose of the robotic device 101. Commands from the smart control device 110 can be delivered to the drive subsystem 124, the local control subsystem 125, the pose control subsystem 126, the sensor subsystem 122 or any other system or subsystem of the robotic device 101 in order to control the operation, control, movement or positioning of the robotic device 101. Similarly, feedback communication (e.g. from position or movement sensors) from the drive subsystem 124, the local control subsystem 125, the pose control subsystem 126, the sensor subsystem 122 or any other system or subsystem of the robotic device 101 can be delivered to the smart control device 110 via the communication subsystem 120. The sensor 111 of the smart control device 110 can also provide feedback. Thus, the smart control device 110 can be in communication with each component of the robotic device 101 via the communication subsystem 120 as applicable to facilitate selective or concurrent actuation of any portion of the drive subsystem 124, the local control subsystem 125, the pose control subsystem 126, deployment and operation of sensors, or control and operation of any other functionality of the robotic device 101.

As described herein, robotic devices according to aspects of the present disclosure can be designed such that logic processing, command execution, data processing, sensing, or any other "smart" function are not an integral part of the build of the robotic device, but rather performed on a non-dedicated smart control device operable to be mechanically and electrically coupled to the robotic device (i.e., supported by or about the robotic device and operable to interface with one or more systems or subsystems of the robotic device), and in many cases one that is removable. In this disclosure, the term non-dedicated refers to at a smart control device capable of operating as a stand-alone electronic device, removable relative to the robotic device. By operating a smart control device with a robotic device, "smart" functions can be performed on the smart control device as opposed to a dedicated system, such as one that is not a stand-alone device or fully integrated into (and perhaps non-removable from) the robotic device. In other words, the dedicated control, sensing, and processing operations (i.e., "smart" functions) that have been previously performed by the robotic device can now be more efficiently performed on the smart control device, with a significant amount, if not all, of the "smart" functionality of various integrated systems being packaged in the smart control device. Various advantages are provided by doing this. For example, a damaged smart control device can thus be easily removed and replaced without significant downtime for diagnostics and repair procedures, the smart control device can also be removed from the robotic device in order to facilitate reprogramming, data manipulation, and the like. In another aspect, a single smart control device can be interchangeable and used in multiple different robotic devices. It should be noted that a non-dedicated smart control device can include a pre-existing type of device (e.g., a smartphone, a tablet computer, or other portable or mobile personal computing device) programmable with software adapted for use with the robotic device. Moreover, the smart control device can comprise a self-contained device independent of the robotic device configured to support at least some, if not all, of the components needed to facilitate "smart" functionality within the robotic device. In other words, the smart control device can itself comprise a housing, a framework or chassis, with all of the internal logic, circuitry, and other components needed to provide the "smart" functions within the robotic device, and that is capable of interfacing with the robotic device 101 (e.g., via the communications subsystem) mechanically, electrically, and in any other manner to enable the smart control device to operate, activate, control, communicate with, etc. the robotic device 101, its systems and subsystems, and in some cases a remote control device.

The function of the smart control device 110 can extend far beyond controlling movement and pose of the robotic device 101 that it controls. For example, the smart control device 110 (e.g., the high-level function module 112), when used in conjunction with other sensors (e.g. IMU, cameras, RGBD cameras, LIDAR, GPS modules, etc.), can be used to implement and execute high-level functions such as location and mapping of the environment (e.g., using a camera and IMU) in which the robotic device is used. In another example, the smart control device 110, the high-level function module 112 can enable various behaviors, such as self-stabilization, target identification, target following, path recording, retrace a path and follow pre-defined paths, detect and identify objects, terrain and environment features, animals and people, and detect and avoid and/or overcome obstacles (including, developing behaviors through trial and errors combined with machine learning algorithms). In yet another example, the smart control device 110 can respond to robot internal and environment monitoring sensor inputs (e.g., map and travel along a chemical concentration gradient toward its source, identify hot spots, etc.). In addition, the smart control device 110 (e.g., via the high-level function module 112) can implement any other behavior that aims to deal with uncertainty in the environment.

Various smart control devices are contemplated, and any such device capable of controlling a robotic device is considered to be within the present scope. In general, a smart control device can include one or more sensors and has the ability to process data and provide communication (e.g., one-way, two-way, Bluetooth-based, RF-based, optical-based). Smart control device sensors can include a camera, a microphone, an accelerometer, a gyroscope, a gravity sensor, a compass, a barometer, a proximity sensor, a temperature sensor, a relative humidity sensor, a light sensor, a magnetic field sensor, an orientation sensor, or any other suitable sensor that may be incorporated into a smart device. Non-limiting examples of smart control devices can include cellular devices, wireless network devices, Bluetooth devices, and the like, including combinations thereof. In one aspect, the smart control device can be an existing device, such as a cellular phone having on-board computing and processing capabilities and sensors, such as a smartphone. In other aspects, the smart control device can be a tablet computer, a laptop computer, a wearable computing device, or again, any other portable or mobile computing device. Many smartphones, tablet computers, wearable computing devices, and laptop computers contain sufficient computational resources, sensors, and other "smart" functionality capable of controlling and interfacing with the robotic device, including movement of the drive subsystems, movement of the linkage subsystem, sensing and sensor data processing, data processing, video, audio, and the like. As such, upon interfacing with the systems of the robotic device, a smart control device can allow enhanced functionality of a robotic device without the need for complex integrated and dedicated control and processing systems.

Additionally, in some aspects the smart control device 110 can provide enhanced functionality to the robotic device 101. Such functionality is only limited by the capabilities of the particular smart control device being used. For example, using a smartphone allows the functionality available to or on the smartphone to be utilized in the control and operation of the robotic device 101. For example, a smartphone can provide wireless communication to the device, wireless communication external to the device, GPS data, accelerometer data, vibration detection, a user interface, camera or video functionality, audio input, audio output, sensor processing, navigation, control, and the like, including combinations thereof. Additionally, applications can be created for the smartphone that enhance the functionality of the device. Such applications can be very dynamic in nature, and can be updated directly to the smartphone without the need for disconnection or rebooting. Accordingly, a smartphone can provide similar functionality as a dedicated control system at a fraction of the cost, with an enhanced capability of dynamic reconfiguration, and built-in communication with a user over a wireless network, such as a cellular, Bluetooth, or Wi-Fi network to name a few.

As has been described, the smart control device 110 can be any device with sufficient on-board resources, functions and components (e.g., computational resources and components, sensors, etc.) to control a robotic device according to aspects of the present disclosure. In some cases, the smart control device 110 can be self-contained, portable, and allow independent user interaction separate from the robotic device. Thus, the robotic device 101 can be left in one environment while changes are made to the smart control device 110 in another environment. The smart control device 110 can also be considered to be a general-purpose communication device having its own form factor. Utilizing such a device having built-in communication capabilities can greatly simplify the design and cost of a robotic device. Additionally, the smart control device 110 can be disposed of and replaced with another unit for comparably low cost and effort, including being replaced by another smart control device having enhanced size, weight and power, and computation (SWaP-C) capabilities as technology improves and new devices become commercially available.

As mentioned above, the smart control device 110 can control sensors of the robotic device 101. This includes control of the sensor 123 of the sensor subsystem 122 as well as the sensor 111 of the smart control device 110. The sensor 123 can represent external data collection devices. The communication subsystem 120 can provide communication between the smart control device 110 and any such external data collection devices. Such ancillary external data collection devices can be devices or systems utilized to collect data from or otherwise manipulate the environment external to the device. Non-limiting examples of such can include any suitable sensor (e.g., an optical sensor or camera, a RGBD camera, an RFID reader, a gas analyzer, a spectrometer (e.g., a chemical spectrometer, spectrometers operating in different part of the electromagnetic spectrum, such as visible, infrared, x-ray, and gamma ray, and the like), a vibration sensor, an accelerometer, barometers, a pressure sensor, an inertial sensor, a gyroscope, a compass, a magnetometer, an explosive detector, radio isotopes sensors, alpha and beta particles sensors, a neutron detector, an RF detector, an electro-magnetic emission sensor, a physiologic sensor, a LIDAR, a stereo camera, a thermal sensor, an IR imager, an acoustic sensor, a strain sensor, a load sensor, a velocity sensor, a sound triangulation and location sensor, an electric field sensor), measurement devices or systems, inspection devices or systems, mass spectrometers, ion mobility sensors, chemiluminescent sensors, electron capture detection devices, electrochemical analyzers, specialized gas sensors, (spectroscopy—methane, propane, ammonia, CO, smoke, etc.), surface acoustic wave sensors, tactile whiskers, radiation detectors, metal detectors, other detector types, magnetometers, inertial measurement units, non-destructive inspection methods (x-ray, dye penetrant, ultrasonic, eddy current, magnetic particle, interferometry), and the like, including associated applications to handle the processing, storage and real-time or eventual communication and use of the results. A camera can be sensitive to a certain portion of the EM spectrum. In some aspects, the external data collection device can be an additional non-dedicated smart control device, such as, for example, a smartphone.

In one aspect, the smart control device 110 can be integrated into the robotic device 101 to allow the device to operate autonomously, in some cases for an extended period of time. In one example, the high-level functions module 112 can implement various movement primitives and/or higher level behaviors (e.g. simultaneous localization and mapping, path following and path retracing, target identification and following, object avoidance, obstacle detection and overcoming behaviors, machine learning enabled behaviors, and the like), which can be preprogrammed into the smart control device 110, including for example primitives to assume certain poses, and primitives for movement (e.g., forward, backwards). Control can include feedback from force sensors (e.g., at a joint of the robotic device 101) and environmental sensors (e.g. move to follow an increasing chemical concentration gradient; move toward a temperature hot zone; move toward a gamma radiation zone, and the like). In this way, hybrid human and automated control can be combined, and behavior that require coordinated motion of multiple smart control devices equipped robotic devices can be enabled. For example, high-level manual commands/primitives can be implemented using automated low-level feedback loops that execute the commands/primitives. Control function can be divided into subsystems, including for example, pose control, compliance control, movement control, force control, and hybrid combinations thereof. In one aspect, the local control subsystem 125 can be operable to implement behaviors at the joint level (e.g. controlling compliance, enabling fail-safe mode of operation, and the like).

In addition to controlling functionality, the smart control device 110 can provide benefits due to its removability from the robotic device 101. For example, upgrades, programming modifications, and the like can be accomplished remote from the robotic device 101 on the smart control device 110, which can then be physically or electrically (including wirelessly) coupled to the robotic device 101. As such, the smart control device 110 can be "plug-and-play," and thus can provide functionality to the robotic device 101 upon connection thereto.

Furthermore, data collected by the sensor 123, the sensor 111, or other devices on the robotic device 101 can be stored as well as processed on the smart control device 110. Data can be removed from the robotic device 101 by merely removing the smart control device 110, upon which the data is resident. Additionally, data can be transmitted from the smart control device 110 to a remote location over a medium such as a cellular network, a computer network (e.g., LAN, internet, via Wi-Fi, etc.), a peer-to-peer network (e.g., via Bluetooth), or any other suitable wireless network. For those aspects utilizing a cellular device such as a smartphone, the cellular functionality is already resident on the smartphone, which can be readily utilized for communication to and from the smartphone. Thus, the smart control device 110 can facilitate connection to the internet 130 or other network, which can allow the smart control device 110 to share processor computational tasks with other computational assets on the network, such as a remote processor 131, and/or another smart control device.

The remote control device 102 can be operable to wirelessly communicate with the smart control device 110 of the robotic device 101 to facilitate remote control and access of the robotic device 101 by a user. The remote control device 102 can function as a user interface to allow a user to provide control instructions to the smart control device 110 over a wireless communication medium such as a cellular network, a computer network (e.g., LAN, internet, via Wi-Fi, etc.), a peer-to-peer network (e.g., via Bluetooth), or any other suitable wireless network. As such, a user can provide communication to the smart control device 110 via the remote control device 102 in order to control the robotic device 101. The data from the various sensors 123 on the robotic device 101 or the sensor 111 of the smart control device 110 can further be transmitted by the smart control device 110 to the remote control device 102. Thus, data from sensors, video, or audio from the integrated hardware of the smart control device 110, and the like can be communicated to the user, where further control commands can be delivered. Communication with the remote control device 102 can allow the smart control device 110 to share processor computational tasks with the remote control device 102, which may include a processor or other such computational assets, or communication with another smart control device. It is noted that the wireless communication medium can include any known wireless communication medium including, without limitation, cellular communication, Wi-Fi communication, Bluetooth communication, and the like, including combinations thereof. The remote control device 102 or the smart control device 110 can be operable to encrypt and decrypt data to provide secure communication.

The remote control device 102 can include any appropriate device capable of sending and receiving commands to and from the smart control device. Non-limiting examples of such remote control devices can include cellular phones, smartphones, tablet devices, laptop computers, desktop computers, and the like. In one embodiment, the remote control device 102 can comprise a non-dedicated, smart control device as described herein that can provide smart functionality facilitating user control of the robotic device 101. Thus, one non-dedicated, smart control device (e.g., the remote control device 102) can be used to control the robotic device 101, which is equipped with another non-dedicated, smart control device 110.

As a communication interface, the remote control device 102 can be configured to display information related to control or operation of the robotic device 101. Such information can be displayed in any suitable manner, such as visually, audibly, or haptically. For example, the remote control device 102 can be operable to display a video of images or reproduce audio captured by the robotic device 101. A visual display can be in a numerical or a graphical format, for example. The remote control device 102 can display information, such as related to position or force data of joints of the robotic device 101, by producing vibrations. In one aspect, the remote control device 102 can be operable to display sensor data from the robotic device 101, such as data collected by the sensor 123 or the sensor 111. In another aspect, the remote control device 102 can be operable to display commands given by an operator or user. In addition, the remote control device 102 can be operable to display feedback from the robotic device 101 to the operator of the actual state of the robotic device 101, such as position or force information of one or more degrees of freedom of the robotic device 101. The remote control device 102 can also be operable to provide a comparison of the commands given by the operator compared with the feedback from the feedback from the robotic device 101.

Additionally, in some embodiments the remote control device 102 can include or comprise a master control device, such as a replica or other type of master, for control of the robotic device 101. In a replica master control system, a replica master is located remotely from the robotic device 101. The replica master can contain the same joints as the robotic device 101, and can be manually manipulated into the desired poses. Sensors located at the joints sense the position of the joints, and these positions are communicated to the smart control device 110 on the robotic device 101 to actuate the pose control subsystem 126, the local control subsystem 125, or the drive subsystem 124 to attempt to establish the same pose. Optionally, the joints in a linkage subsystem can include force sensors, torque sensors, or both, allowing the force or torque on the joints to be measured. The joint forces or torques can optionally be communicated back to the replica master, providing force feedback into the control system. Various force feedback control systems are known that can be applied to embodiments of the present disclosure.

The remote control device 102 can comprise any suitable master controller or other device for remotely controlling the robotic device 101. For example, the remote control device 102 can comprise a replica master controller as discussed above, a video game controller, a video game interface device, a master controller that is wearable by an operator, a master controller that measures one or more joint positions of the operator, a master controller that measures forces generated at one or more joints of the operator, a master controller that measures at least one of position and force information and converts the information as a set of commands to the robotic device, a transformation master controller where human kinematics are transformed to kinematics of the robotic device 101 (with or without constraints that may be required to compensate for information that may be missing in kinetically redundant robotic devices), a force reflection master controller operable to provide force information from the robotic device 101 to the operator in at least one of a force applied to the operator, a vibration generated by at least one vibration source, a sound, or a visual display, or any other suitable remote control device. Information can be displayed haptically to an operator by a master control device, such as by applying forces or providing resistance to movement (e.g., a force reflection master controller). For example, forces at one or more joints of the robotic device 101 can be represented at a corresponding joint of a master control device. A master control device can also be configured to control an end effector of the robotic device 101. In this case, forces experienced by the end effector can also be indicated by the master control device.

In one aspect, the remote control device 102 can comprise a master control device that can communicate position or force information of the master and communicate this information to the robotic device 101 as a set of commands. In another aspect, a master control device can receive position or force information from the robotic device 101 for feedback to the user. For example, the smart control device 110 can communicate position or force information as a set of commands for controlling the master control device to provide feedback to the operator. In one embodiment, a master control device can be configured to transform human kinematics to kinematics of the robotic device 101 as required to carry out one or more tasks. In another example, the remote control device 102 can receive position or force data and can generate its own set of commands for providing feedback to the operator through a master control device.

The smart control device 110 can be coupled to the robotic device 101 by any useful coupling technique, including, for example, a physical mount. Such a physical mount can be coupled to the robotic device 101 in a variety of ways, all of which are included or contemplated in the present scope. For example, a mounting bracket can be coupled between a physical mount and a subsystem structure (e.g., a structure of the drive subsystem 124) or a component of a subsystem. The physical mount can provide additional functionality, such as a protective case, shock absorption, etc., depending upon its configuration. It should be recognized that the smart control device 110 can be coupled anywhere on the robotic device 101, such as to a component or structure of the drive subsystem 124 or the pose control subsystem 126.

The communication subsystem 120 can be functionally or operationally (e.g., electrically, mechanically, etc.) coupled between the smart control device 110 and the robotic device 101 to facilitate control by the smart control device 110 of the drive subsystem 124, the local control subsystem 125, the pose control subsystem 126, the sensor subsystem 122, or any other system or subsystem of the robotic device 101.

The design of the physical mount can thus vary depending on the communication medium between the smart control device 110 and the robotic device 101. In some aspects, the physical mount can be primarily a physical support structure. Such may be the case for wireless communication between the smart control device 110 and the robotic device 101. In other aspects, the physical mount can also include or support a physical electrical communication connector such as a pinned connection or other type of physical connector for interfacing with the smart control device 110. Such may be the case for wired communications between the smart control device 110 and the robotic device 101.

In one aspect, a mount for the non-dedicated smart control device 110 can be configured to accept and removably support the smart control device 110, which can be configured to initiate and control operational functionality within the robotic device 101 upon being connected to the robotic device 101. The communication subsystem 120 can be functionally coupled between the robotic device 101 and the mount such that the robotic device 101 and the smart control device 110 are functionally coupled upon connection. The communication subsystem 120 facilitates control by the smart control device 110 (once connected) of one or more subsystems of the robotic device 101.

Various drive subsystems are contemplated, and any useful drive mechanism is considered to be within the present scope. Non-limiting examples of drive mechanisms can include tracks, wheels, legs, arms, constriction-mediated movement devices, propellers, and the like. In one specific embodiment, a drive subsystem can include a continuous track that is movable by a motor about a support frame. Similarly, various pose control subsystems are contemplated and any useful pose control mechanism is considered to be within the present scope. In one example, the pose control subsystem 126 can comprise a linkage subsystem. A linkage subsystem can include any suitable type of linkage mechanism to facilitate pose or motion of at least a portion of the robotic device 101. In one aspect, the linkage subsystem can include a multi-degree of freedom linkage. It should be recognized that joints or linkages of a linkage subsystem discussed herein can be actuated or passive, in any combination. In one aspect, a linkage mechanism can include an actuated joint to provide motion in one or more degrees of freedom. In another aspect, a linkage mechanism can include a passive joint that can be manipulated or movable to a selectively fixed position and held in place, for example, by incorporating an adjustable fastener. In a further aspect, a passive joint or linkage can include a dampener or a spring to control various aspects (e.g., those related to movement) of the joint or linkage. Joints of a linkage mechanism can be uni-axial, bi-axial, tri-axial joints, or any other suitable joint configuration. Joints need not be limited to revolute joints which provide bending or rotational movement. Prismatic joints that provide translational movement can also be included. Joints may incorporate both revolute and prismatic features to provide, for example, eccentric motions. Thus, joints can be configured to provide movement in rotational or translational degrees of freedom. It should be recognized that components or features of the linkage subsystem discussed herein can be applicable to a drive subsystem as well. Those skilled in the art will recognize the many different configurations or types of robotic devices that could be designed and used with a smart control device as taught herein to provide smart functionality to the robotic device as discussed herein. For example, these can include snake-like or serpentine type robotic devices, legged robotic devices, wheeled robotic devices, tracked robotic devices, and other ground traversing robotic devices. These can also include aerial or amphibious robotic devices. Essentially, it is contemplated that the smart device and associated smart functionality can be used to control the operational functions of any type of robotic device. As such, the present technology should not be limited in any way to those types of robotic devices specifically discussed herein.

In one embodiment, the drive subsystem 124 can include a drive to facilitate rotation, bending, or movement of the various components of the pose control subsystem 126. Similarly, a drive can be utilized to facilitate movement of the drive subsystem 124. In some aspects, the drive that actuates the drive subsystem 124 can also actuate all or a portion of the pose control subsystem 126. In other words, the same drive that causes movement of a drive subsystem can also cause movement of an associated part of the pose control subsystem 126. In other aspects, the drive that facilitates rotation, bending or movement of the components of the pose control subsystem 126 can be a dedicated drive. As will be recognized by those skilled in the art once in possession of the present disclosure, various types of drives and coupling techniques for applying drive power to a drive subsystem or a pose control subsystem can be utilized.

Figure 2:
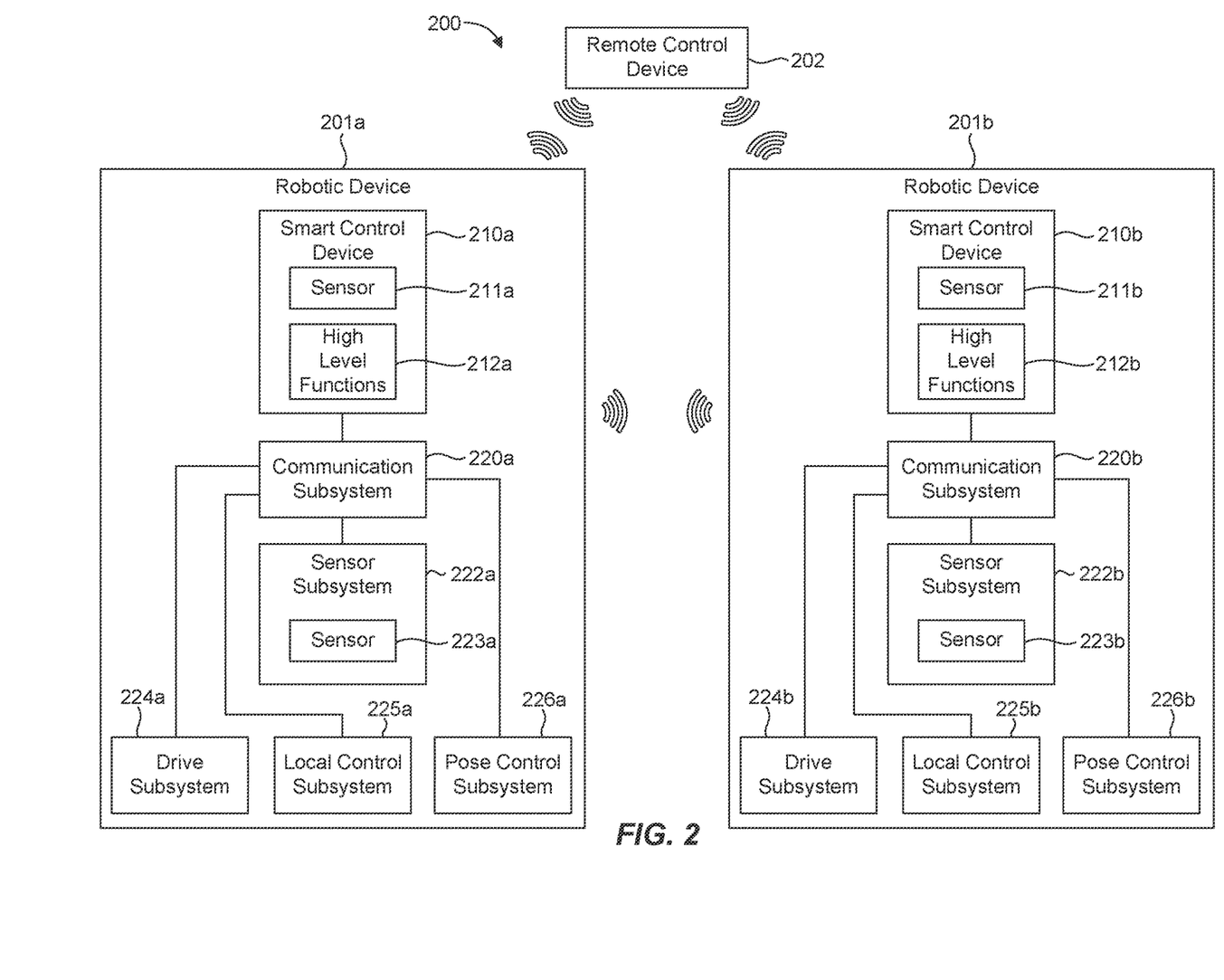
FIG. 2 is a schematic illustration of a robotic system in accordance with another example of the present disclosure.

FIG. 2 illustrates a robotic system 200 in accordance with another example of the present disclosure. The robotic system 200 is similar in many respects to the robotic system 100 discussed above with respect to FIG. 1. The robotic system 200 can include multiple robotic devices 201*a*, 201*b*, each of which can be configured in any suitable manner disclosed herein. Although two robotic devices are illustrated, it should be recognized that any suitable number of robotic devices can be utilized. The robotic devices 201*a*, 201*b* can each include local, non-dedicated smart control devices 210*a*, 210*b*, respectively, that can provide smart functionality to control operational functions of the robotic devices 201*a*, 201*b*, respectively. The robotic devices 201*a*, 201*b* can further include respective communication subsystems 220*a*, 220*b* functionally coupled to the local smart control devices to facilitate control by the local smart control devices 210*a*, 220*b* of one or more operational subsystems of the robotic devices 201*a*, 201*b*, such as sensor subsystems 222*a*, 222*b*, drive subsystems 224*a*, 224*b*, local control subsystems (e.g., local or degree of freedom (DOF) control subsystems 225*a*, 225*b*), and/or pose control subsystems 226*a*, 226*b*. The sensor subsystems 222*a*, 222*b* can include sensors 223*a*, 223*b*, respectively. The smart control devices 210*a*, 210*b* can also include sensors 211*a*, 211*b*, respectively. In addition, the smart control devices 210*a*, 210*b* can include high-level functions modules 212*a*, 212*b*.

In addition, the robotic system 200 can include a remote control device 202, which can be configured in any suitable manner disclosed herein. The remote control device 202 can communicate operational information with the local smart control devices 210*a*, 210*b* to facilitate user control of the robotic devices 201*a*, 201*b*. As with other examples disclosed herein, the robotic devices 201*a*, 201*b* can be in communication with the remote control device 202 (which may include a processor), a remote processor (not shown), or other computational assets over a wireless communication medium such as a cellular network, a computer network (e.g., LAN, internet, via etc.), a peer-to-peer network (e.g., via Bluetooth), or any other suitable wireless network. Communication with the remote control device 202, a remote processor, or other computational assets can allow one or more of the smart control devices 210*a*, 210*b* to share processor computational tasks with other computational assets on a network, or with other smart control devices communicating with each other either via one or more communication hubs or peer-to-peer communication channels. In one aspect, the remote control device 202 can comprise a remote non-dedicated, smart control device as disclosed herein.

In addition, the smart control devices 210*a*, 210*b* can be in communication with one another (e.g., peer-to-peer) over a wireless communication medium (e.g., Bluetooth), which can facilitate sharing of computational resources among the local smart control devices, an exchange of data, communication of commands (i.e., in addition to or as an alternative to communication of commands from the remote control device 202). In one aspect, peer-to-peer communication between smart control devices can facilitate the creation of a self-organizing network and/or implementation of coordinated behaviors, sensing, detection, classification, and/or other capabilities. In one example, peer-to-peer communication capability can allow multiple robotic devices equipped with smart control devices to act as swarms, creating wide-aperture arrays where distributed multi-modal sensing capabilities along with smart control devices (each having limited SWaP-C) can significantly outperform the geo-location, mapping, detection, and effect that can be achieved by a single smart control device equipped system or a large group of independently operating smart control devices equipped system.

In one aspect, the remote control device 202 can be configured to display data collected by the sensors 223*a*, 223*b* of the robotic devices 201*a*, 201*b*. For example, multiple robotic devices can be deployed over an area or along a line to effectively provide a broad aperture array for data collection and data processing. Data collected from the one or more robotic devices (e.g., one or both of robotic devices 201*a*, 201*b*, and any others) can be coordinated and displayed by and on the remote control device 202.

Figure 3:
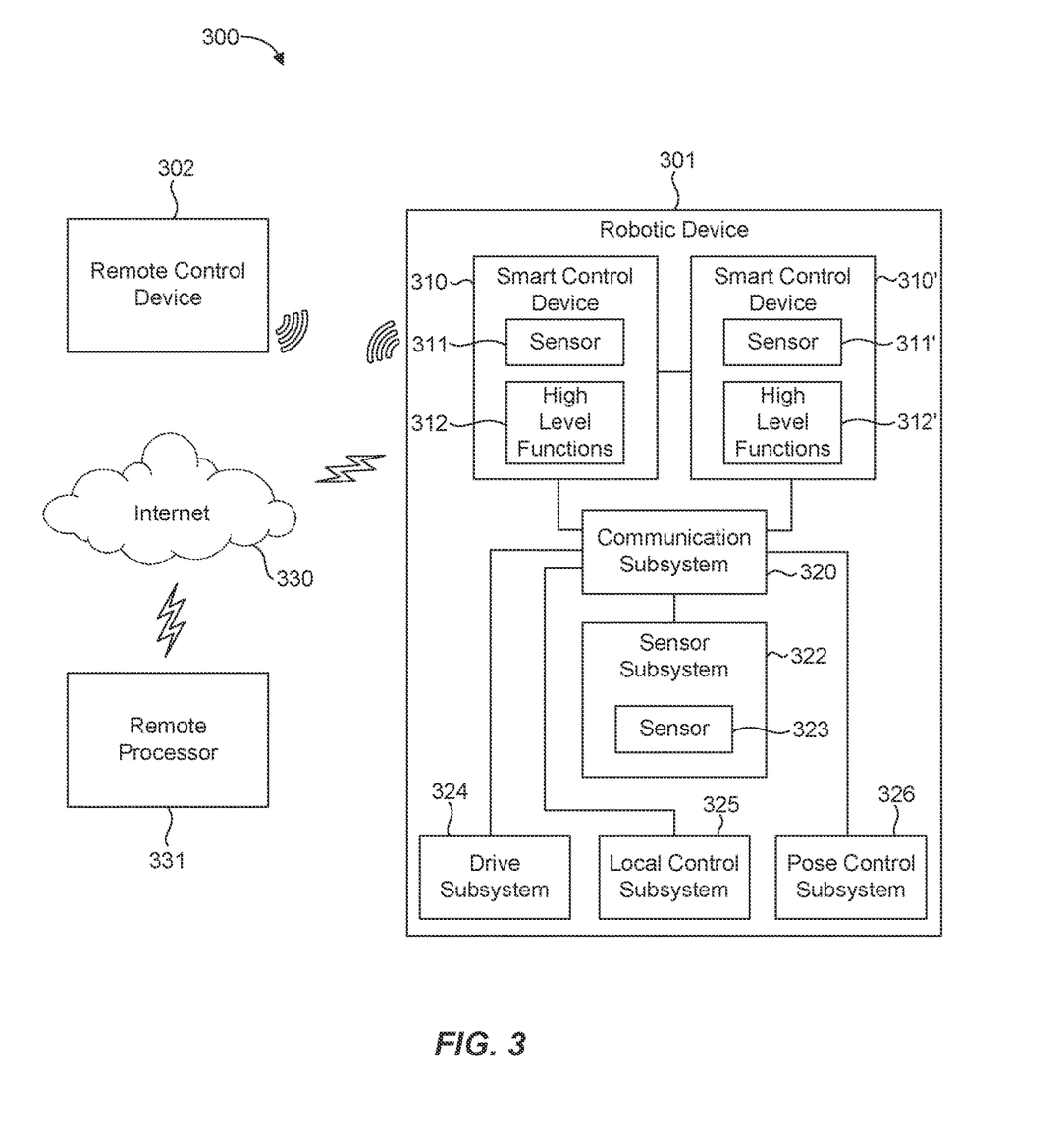
FIG. 3 is a schematic illustration of a robotic system in accordance with yet another example of the present disclosure.

FIG. 3 illustrates a robotic system 300 in accordance with yet another example of the present disclosure. The robotic system 300 has many similarities with other robotic systems discussed herein. For example, the robotic system 300 can include a robotic device 301, which can be configured in any suitable manner disclosed herein. The robotic system 300 can also include a remote control device 302, which can also be configured in any suitable manner disclosed herein. In this case, the robotic device 301 includes multiple local, non-dedicated smart control devices 310, 310' that can each provide smart functionality to control operational functions of the robotic device 301. Although two local smart control devices are illustrated, it should be recognized that any suitable number of local smart control devices can be utilized. The robotic device 301 can further include a communication subsystem 320 functionally coupled to the local smart control devices 310, 310' to facilitate control by the local smart control devices of one or more operational subsystems of the robotic device 301, such as a sensor subsystem 322, a drive subsystem 324, a local control subsystem (e.g., a local or degree of freedom (DOF) control subsystem 325), and/or a pose control subsystem 326.

The remote control device 302 can communicate operational information with one or more of the local smart control devices 310, 310' to facilitate user control of the robotic device 301. As with other examples disclosed herein, the robotic device 301 can be in communication with the remote control device 302 (which may include a processor), a remote processor 331, or other computational assets over a wireless communication medium such as a cellular network, a computer network (e.g., LAN, internet 330, via Wi-Fi, etc.), or any other suitable wireless network. Communication with the remote control device 302, the remote processor 331, or other computational assets can allow one or more of the smart control devices 310, 310' to share processor computational tasks with other computational assets on a network. In one aspect, the remote control device 302 can comprise a remote non-dedicated, smart control device as disclosed herein. In addition, the smart control devices 310, 310' can be in communication with one another over a wired or a wireless communication medium, which can facilitate sharing of computational resources among the local smart control devices 310, 310' such that processor computational tasks can be shared among multiple local smart control devices.

The sensor subsystem 322 can include one or more sensors 323. The smart control devices 310, 310' can also include sensors 311, 311', respectively. In addition, the smart control devices 310, 310' can include high-level functions modules 312, 312', respectively. Multiple local smart control devices 310, 310' functionally coupled to the communication subsystem 320 can facilitate multiple communication paths for the on-board sensor 323 for data processing or for communication to an operator via the remote control device 302.

In some embodiments, at least two of the sensors 311, 311', 323 can be of a common type (e.g., optical sensor type, audio/acoustic sensor type, etc.). In one aspect, sensors of a common type can provide the ability to compare data obtained from different sensors, such as a comparison between the sensor 311 or 311' of a smart control device with the sensor 323 resident or on-board the robotic device 301. In another aspect, sensors of a common type can be used together to provide enhanced imaging. For example, at least two of the sensors 311, 311', 323 can be optical sensors (e.g., cameras) to facilitate acquisition of three-dimensional imaging for viewing of images by an operator. In another example, at least two of the sensors 311, 311', 323 can be audio/acoustic sensors (e.g., microphones) to facilitate acquisition of stereo sound. In yet another aspect, sensors of a common type can be operated independent of one another, which can provide multiple data references (e.g., multiple views when using cameras).

When using optical sensors, it may be desirable for the sensor 323 to include a camera having a higher resolution as compared to a camera of the smart control devices 310, 310'. In addition, cameras or camera filters sensitive to desired portions of the electromagnetic spectrum can be associated with the robotic device 301 to obtain data that may not be available to an onboard imaging system of the smart control devices 310, 310', such as, for example, IR, UV, x-ray, gamma ray, microwave, and the like. Similarly, when sensing audio, such as from an audio pick-up device (e.g., a microphone), it may be desirable for the sensor 323 to include an audio pick-up device that is more sensitive as compared to an audio pick-up device of the smart control devices 310, 310' for enhanced audio data collection.

The present disclosure further sets forth a method for operating and controlling a robotic device comprising obtaining a robotic device, the robotic device comprising one or more systems or subsystems, each operable to facilitate control of an operational function of the robotic device; operationally coupling or connecting, and supporting on-board the robotic device, one or more non-dedicated smart control devices with at least one of the one or more systems or subsystems of the robotic device, each smart control device providing smart functionality to the robotic device, such as to control an operational function of the robotic device; and operating the smart control device to initiate and control one or more of the operational functions of the robotic device. The method can further comprise operating the robotic device with a remote control device operable to communicate operational information to the local smart control device on-board the robotic device to facilitate remote user control of the robotic device. The operation of coupling or connecting the one or more non-dedicated smart control devices with one or more systems or subsystems of the robotic device can comprise operationally coupling or connecting the smart control device to a communication subsystem of the robotic device to facilitate control by the smart control devices of at least one operational subsystem of the robotic device. For example, the communication subsystem can be in communication and operable with a drive subsystem, a pose control subsystem, a sensor subsystem, or any other system or subsystem, or any combination of these.

In one example, the method can further comprise coupling or connecting a plurality of non-dedicated smart control devices with one or more systems or subsystems on a single robotic device, each of the plurality of smart control devices being operable to function as described herein.

The method can further comprise operating the at least one smart control device within at least one of a computer network or a cellular network, or both of these, wherein the at least one smart control device is operable to communicate with the computer or cellular network. In one example, at least one of the plurality of smart control devices can be operable to share processor computational tasks with a remote processor via the computer or cellular network. In another example, two or more smart control devices can be operable to communicate with each other and to share processor computational tasks with one another.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, a plurality of items, structural elements, compositional elements, or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A robotic device, comprising:
   at least one operational subsystem;
   a plurality of non-dedicated control devices, each control device providing functionality to control an operational function of the robotic device, and wherein at least two of the plurality of non-dedicated control devices are operable to:
   communicate with a computer network, and
   share processor computational tasks with one another via the computer network;
   a communication subsystem operationally coupled to the at least one operational subsystem and each of the non-dedicated control devices, the communication subsystem facilitating selective communication of the at least one operational subsystem with each of the non-dedicated control devices.

2. The robotic device of claim 1, wherein the communication subsystem is configured to facilitate control by the control devices of the at least one operational subsystem.

3. The robotic device of claim 1, wherein the operational function comprises controlling a sensor.

4. The robotic device of claim 3, wherein the sensor comprises at least one of an optical sensor, a camera, a stereo camera, an RFID reader, a gas analyzer, a chemical spectrometer, a mass spectrometer, a visible light spectrometer, an infrared spectrometer, an x-ray spectrometer, a gamma-ray spectrometer, a vibration sensor, an accelerometer, a barometer, a pressure sensor, an inertial sensor, a gyroscope, a compass, an explosive detector, an RF detector, an electromagnetic emission sensor, a physiologic sensor, a LIDAR, a thermal sensor, an IR imager, an acoustic sensor, a strain sensor, a load sensor, a velocity sensor, a sound triangulation and location sensor, an electric field sensor, an ion mobility sensor, a chemiluminescent sensor, a surface acoustic wave sensor, a tactile whisker, a radiation detector, a metal detector, a magnetometer, or an inertial measurement unit (IMU).

5. The robotic device of claim 3, wherein at least one of the control devices comprises and supports the sensor onboard the control device.

6. The robotic device of claim 5, wherein the sensor comprises a camera, a microphone, an accelerometer, a gyroscope, a gravity sensor, a compass, a barometer, a proximity sensor, a temperature sensor, a relative humidity sensor, a light sensor, a magnetic field sensor, an orientation sensor, an IR imager, a stereo camera, a RGBD camera, a LIDAR or a combination thereof.

7. The robotic device of claim 5, wherein at least two of the control devices have sensors of a common type to facilitate comparison of data obtained by each of the at least two control devices.

8. The robotic device of claim 3, wherein the sensor comprises a camera, and wherein at least two of the control devices comprise cameras.

9. The robotic device of claim 8, wherein the plurality of control devices, having cameras, facilitate acquisition of three-dimensional imaging.

10. The robotic device of claim 8, wherein the plurality of control devices, having cameras, operate the cameras independent of one another.

11. The robotic device of claim 3, wherein the sensor comprises a microphone, and wherein at least two of the control devices comprise microphones.

12. The robotic device of claim 11, wherein the plurality of control devices, having microphones, facilitate acquisition of stereo sound.

13. The robotic device of claim 1, wherein at least one of the plurality of control devices is operable to share processor computational tasks with a remote processor via the computer network.

14. The robotic device of claim 1, wherein at least one of the plurality of control devices is operable to communicate with a cellular phone network.

15. The robotic device of claim 1, wherein one or more of the control devices is operable to communicate with another control device on a peer-to-peer network.

16. The robotic device of claim 1, wherein one or more of the control devices is operable to communicate operational information with a remote control device.

17. The robotic device of claim 16, wherein the remote control device comprises a remote non-dedicated, control device.

18. The robotic device of claim 17, wherein one or more of the control devices is operable to communicate with the remote control device via a peer-to-peer network.

19. The robotic device of claim 1, wherein at least one of the control devices comprises a device selected from a smartphone, a tablet computer, a laptop computer, or a wearable computing device.

20. A robotic system, comprising:
   a robotic device having at least one operational subsystem, a plurality of local non-dedicated control devices, each providing functionality to control an operational function of the robotic device, and a communication subsystem operationally coupled to the at least one operational subsystem and each of the non-dedicated control devices, the communication subsystem facilitating selective communication of the at least one operational subsystem with each of the non-dedicated control devices;

another robotic device having another local non-dedicated control device providing functionality to control an operational function of the other robotic device; and a remote control device to communicate operational information with the plurality of local non-dedicated control devices and the other local non-dedicated control device to facilitate user control of the robotic device and the other robotic device, respectively, and wherein:

at least two of the plurality of local non-dedicated control devices are operable to communicate with one another via a computer network; and share processor computational tasks with one another via the computer network.

21. The robotic system of claim 20, wherein the communication subsystem is configured to facilitate control by at least one of the plurality of local non-dedicated control devices or the other local non-dedicated control device of at least one operational subsystem of the robotic device.

22. The robotic system of claim 20, wherein the operational function comprises controlling a sensor.

23. The robotic system of claim 22, wherein the sensor comprises at least one of an optical sensor, a camera, a stereo camera, an RFID reader, a gas analyzer, a chemical spectrometer, a mass spectrometer, a visible light spectrometer, an infrared spectrometer, an x-ray spectrometer, a gamma-ray spectrometer, a vibration sensor, an accelerometer, a barometer, a pressure sensor, an inertial sensor, a gyroscope, a compass, a magnetometer, an explosive detector, an RF detector, an electro-magnetic emission sensor, a physiologic sensor, a LIDAR, a thermal sensor, an IR imager, an acoustic sensor, a strain sensor, a load sensor, a velocity sensor, a sound triangulation and location sensor, an electric field sensor, an ion mobility sensor, a chemiluminescent sensor, a surface acoustic wave sensor, a tactile whisker, a radiation detector, a metal detector, or an inertial measurement unit (IMU).

24. The robotic system of claim 22, wherein at least one of the plurality of local non-dedicated control devices and the other local non-dedicated control device comprises the sensor.

25. The robotic system of claim 24, wherein the sensor comprises a camera, a microphone, an accelerometer, a gyroscope, a gravity sensor, a compass, a barometer, a proximity sensor, a temperature sensor, a relative humidity sensor, a light sensor, a magnetic field sensor, an orientation sensor, an IR imager, a stereo camera, a RGBD camera, a LIDAR or a combination thereof.

26. The robotic system of claim 22, wherein the remote control device is operable to display sensor data collected by the robotic device.

27. The robotic system of claim 20, wherein the plurality of local non-dedicated control devices, the other local non-dedicated control device, and the remote control device are operable to communicate with one another via a computer network.

28. The robotic system of claim 27, wherein at least one of the plurality of local non-dedicated control devices or the other local non-dedicated control device is operable to share processor computational tasks with a remote processor via the computer network.

29. The robotic system of claim 28, wherein the remote control device comprises the remote processor.

30. The robotic system of claim 20, wherein the plurality of local non-dedicated control devices, the other local non-dedicated control device, and the remote control device are operable to communicate with one another via a cellular network.

31. The robotic system of claim 20, wherein the remote control device comprises at least one of the plurality of local non-dedicated control devices and the other local non-dedicated control device, configured to provide functionality facilitating user control of the robotic device.

32. The robotic system of claim 31, wherein the plurality of local non-dedicated control devices, the other local non-dedicated control device, and the remote control device are operable to communicate with one another via a peer-to-peer network.

33. The robotic system of claim 31, wherein at least one of the plurality of local non-dedicated control devices or the other local non-dedicated control device comprises a smartphone, a tablet computer, a laptop computer, a wearable computing device, or a combination thereof.

34. The robotic system of claim 20, wherein at least one of the plurality of local non-dedicated control devices or the other local non-dedicated control device comprises a smartphone, a tablet computer, a laptop computer, a wearable computing device, or a combination thereof.

35. The robotic system of claim 20, wherein the plurality of local non-dedicated control devices and the other local non-dedicated control device are operable to communicate with one another via a peer-to-peer network.

36. The robotic system of claim 20, wherein the robotic device and the other robotic device each comprise a sensor, and wherein the remote control device is operable to display sensor data collected by the robotic device and the other robotic device.

37. The robotic system of claim 20, wherein the remote control device is operable to display commands given by an operator.

38. The robotic system of claim 37, wherein the remote control device is operable to display feedback from the robotic device to the operator of the actual state of the robotic device.

39. The robotic system of claim 38, wherein the remote control device is operable to provide a comparison of the commands given by the operator compared with the feedback from the robotic device.

40. The robotic system of claim 20, wherein the remote control device is operable to display position information of one or more degrees of freedom of the robotic device.

41. The robotic system of claim 20, wherein the remote control device is operable to display force information of one or more degrees of freedom of the robotic device.

42. The robotic system of claim 41, wherein force information is displayed visually, haptically, or a combination thereof.

43. The robotic system of claim 20, wherein the remote control device is operable to display a video of images captured by the robotic device.

44. The robotic system of claim 20, wherein the remote control device is operable to reproduce audio captured by the robotic device.

45. The robotic system of claim 20, wherein the remote control device is operable to display sensor data from the robotic device.

46. The robotic system of claim 20, wherein the remote control device is operable to encrypt and decrypt data to provide secure communication.

47. The robotic system of claim 20, wherein the remote control device is operable to execute at least one of simultaneous localization and mapping, predefined path following, path recording, path retracing, target identification, target following, object detection, object identification, or obstacle detection and overcoming.

48. The robotic system of claim 20, wherein the remote control device comprises at least one of a video game controller, a video game interface device, a replica master controller, a master controller that is wearable by an operator, a master controller that measures one or more joint positions of the operator, a master controller that measures forces generated at one or more joints of the operator, a master controller that measures at least one of position and force information and converts the information as a set of commands to the robotic device, a force reflection master controller operable to provide force information from the robotic device to the operator by at least one of a force applied to the operator, a vibration generated by at least one vibration source, a sound, or a visual display, or a transformation master controller wherein human kinematics are transformed to kinematics of the robotic device.

49. A method for controlling a robotic device, the method comprising:
  obtaining a robotic device, the robotic device comprising one or more operational subsystems, each operable to facilitate control of an operational function of the robotic device;
  supporting, on board the robotic device, a plurality of non-dedicated control devices, each control device being operable to provide functionality to the robotic device;
  operationally connecting each non-dedicated control device of the plurality of non-dedicated control devices with at least one of the one or more operational subsystems via a communications subsystem, the communication subsystem facilitating selective communication of the at least one operational subsystem with each of the non-dedicated control devices; and
  operating at least one of the control devices to initiate and control one or more of the operational functions of the robotic device, wherein at least two of the plurality of control devices are operable to:
  communicate with a computer network; and
  share processor computational tasks with one another via the computer network.

50. The method of claim 49, further comprising operating the robotic device with a remote control device operable to communicate operational information to the on-board plurality of non-dedicated control device to facilitate remote user control of the robotic device.

51. The method of claim 49, wherein operationally connecting each non-dedicated control device of the plurality of non-dedicated control devices with at least one of the one or more operational subsystems of the robotic device comprises operationally connecting each non-dedicated control device to the communication subsystem to facilitate control by the non-dedicated control devices of the at least one operational subsystem of the robotic device.

52. The method of claim 49, wherein the communication subsystem can be functionally coupled to an operational subsystem of the one or more operational subsystems comprising at least one of a drive subsystem, a pose control subsystem, a local control subsystem, or a sensor subsystem.

53. The method of claim 49, further comprising executing at least one of simultaneous localization and mapping, predefined path following, path recording, path retracing, target identification, target following, object detection, object identification, or obstacle detection and overcoming.

54. The method of claim 49, further comprising operating each non- dedicated control device of the plurality of non-dedicated control devices within at least one of a computer network, a cellular network, or a peer-to-peer network, wherein each non-dedicated control device is operable to communicate with at least one of the computer network, the cellular network, or another control device.

* * * * *